Oct. 25, 1932.   W. F. HEINEMAN   1,883,911
WELDING APPARATUS
Filed Jan. 15, 1931   4 Sheets-Sheet 1

INVENTOR.
Warren F. Heineman
BY
ATTORNEY.

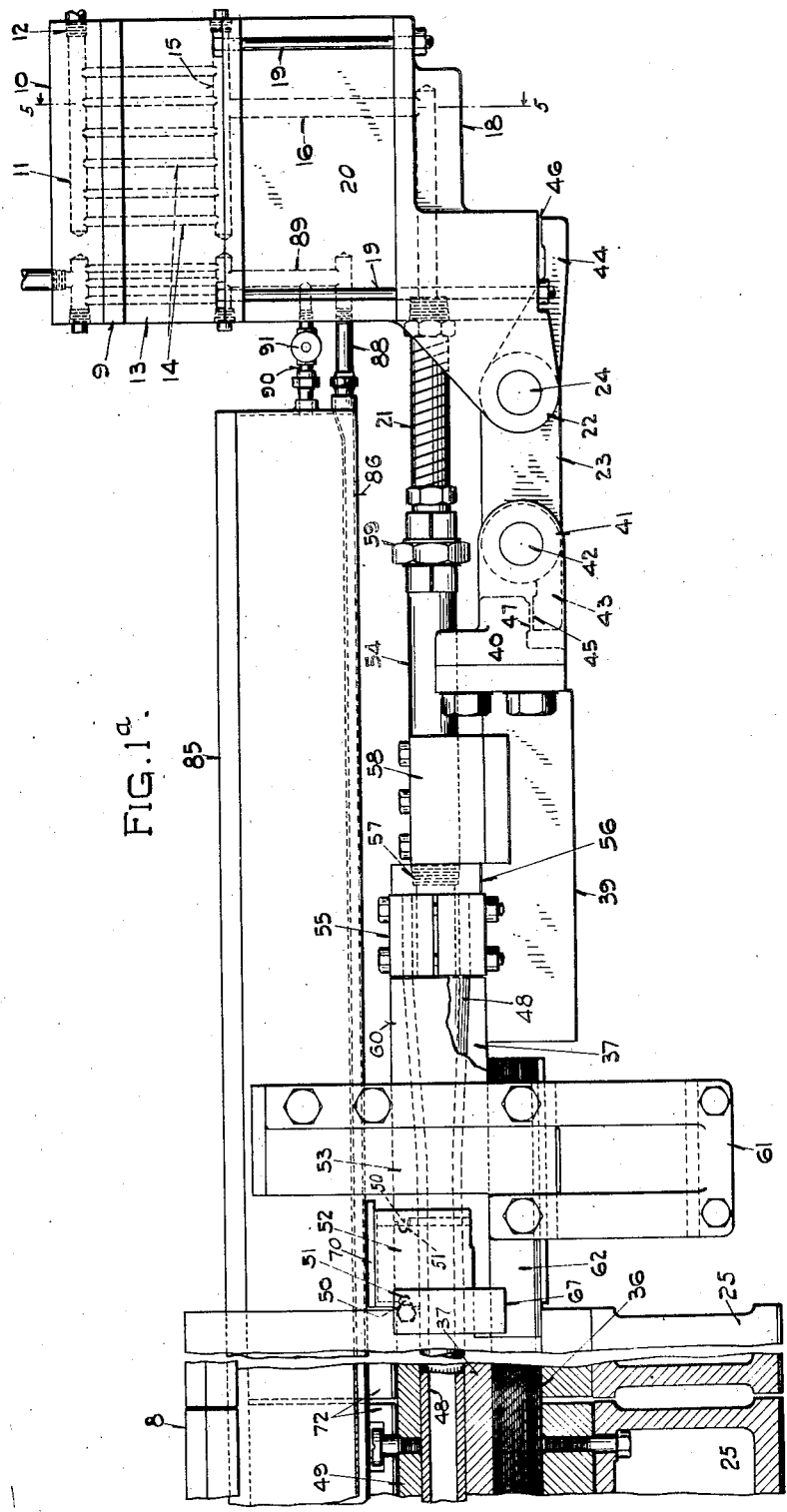

Oct. 25, 1932. W. F. HEINEMAN 1,883,911
WELDING APPARATUS
Filed Jan. 15, 1931 4 Sheets-Sheet 3
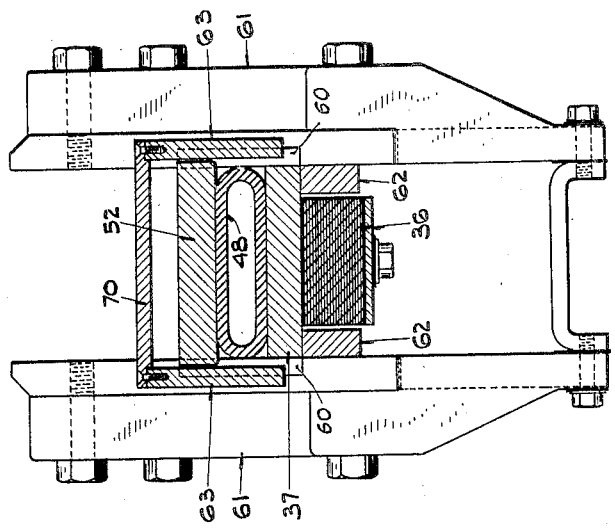
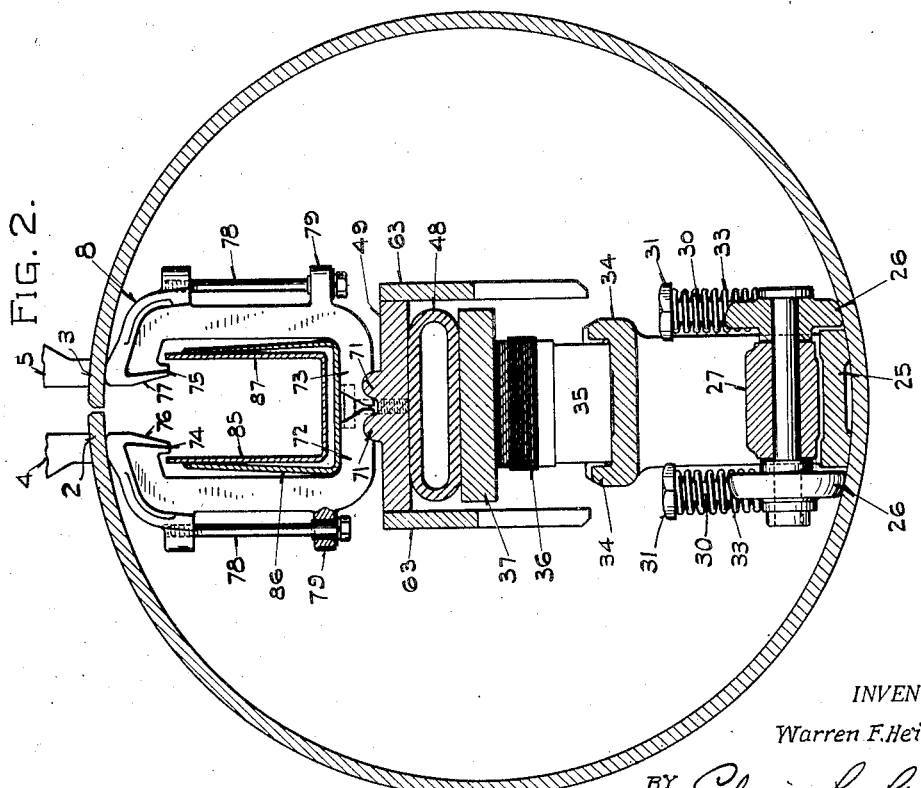
INVENTOR.
Warren F. Heineman
BY
ATTORNEY.

Oct. 25, 1932.   W. F. HEINEMAN   1,883,911
WELDING APPARATUS
Filed Jan. 15, 1931    4 Sheets-Sheet 4
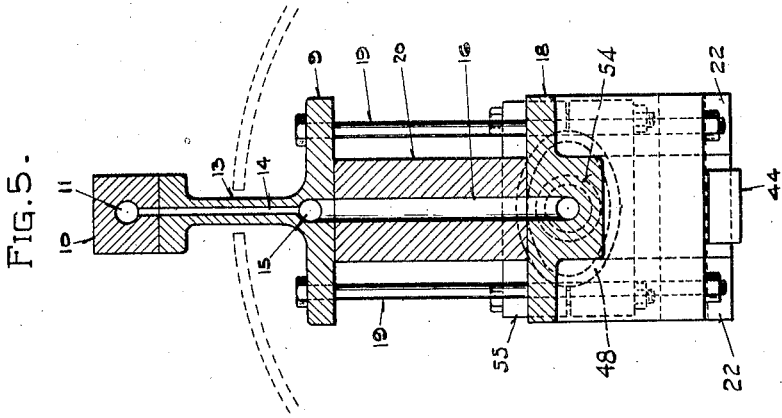
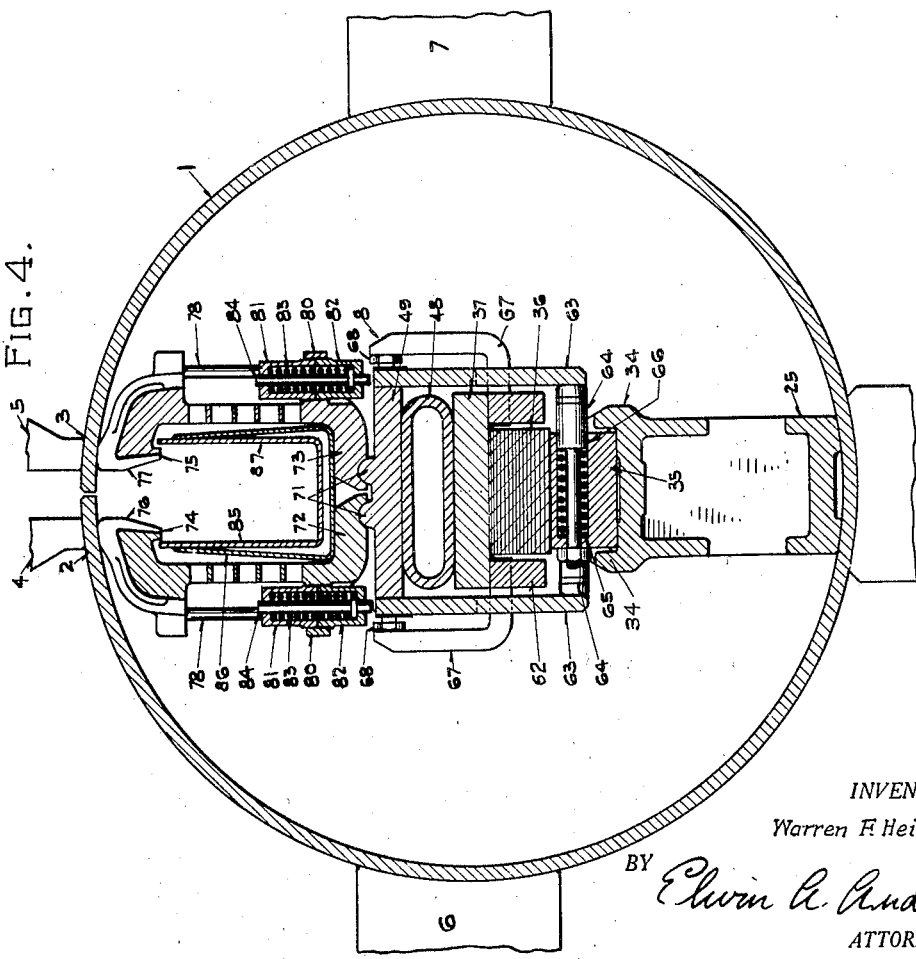
INVENTOR.
Warren F. Heineman
BY
ATTORNEY.

Patented Oct. 25, 1932

1,883,911

UNITED STATES PATENT OFFICE

WARREN F. HEINEMAN, OF SHOREWOOD, WISCONSIN, ASSIGNOR TO A. O. SMITH CORPORATION, OF MILWAUKEE, WISCONSIN, A CORPORATION OF NEW YORK

WELDING APPARATUS

Application filed January 15, 1931. Serial No. 508,855.

This invention relates to the welding of longitudinal seams in tubular articles by the flash welding process and particularly to the construction of an arbor which is adapted to be disposed within the tubular blank to force the walls of the blank into pressure contact with the electrodes.

Reference is made to the copending applications of Birger T. Andren, et al., Serial No. 435,090, filed March 12, 1930 and Eric H. Nilson et al., Serial No. 469,462, filed July 21, 1930, both having a common assignee herewith in which a type of welding machine, for which the present invention is particularly adapted, is disclosed and claimed.

Various objects of the invention will become apparent from the following detail description of the invention.

In the drawings:

Figures 1 and 1ª are views in side elevation of welding apparatus constructed in accordance with the invention, parts being broken away to show the details of the structure.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 is a section taken on line 5—5 of Fig. 1ª.

Figure 1:
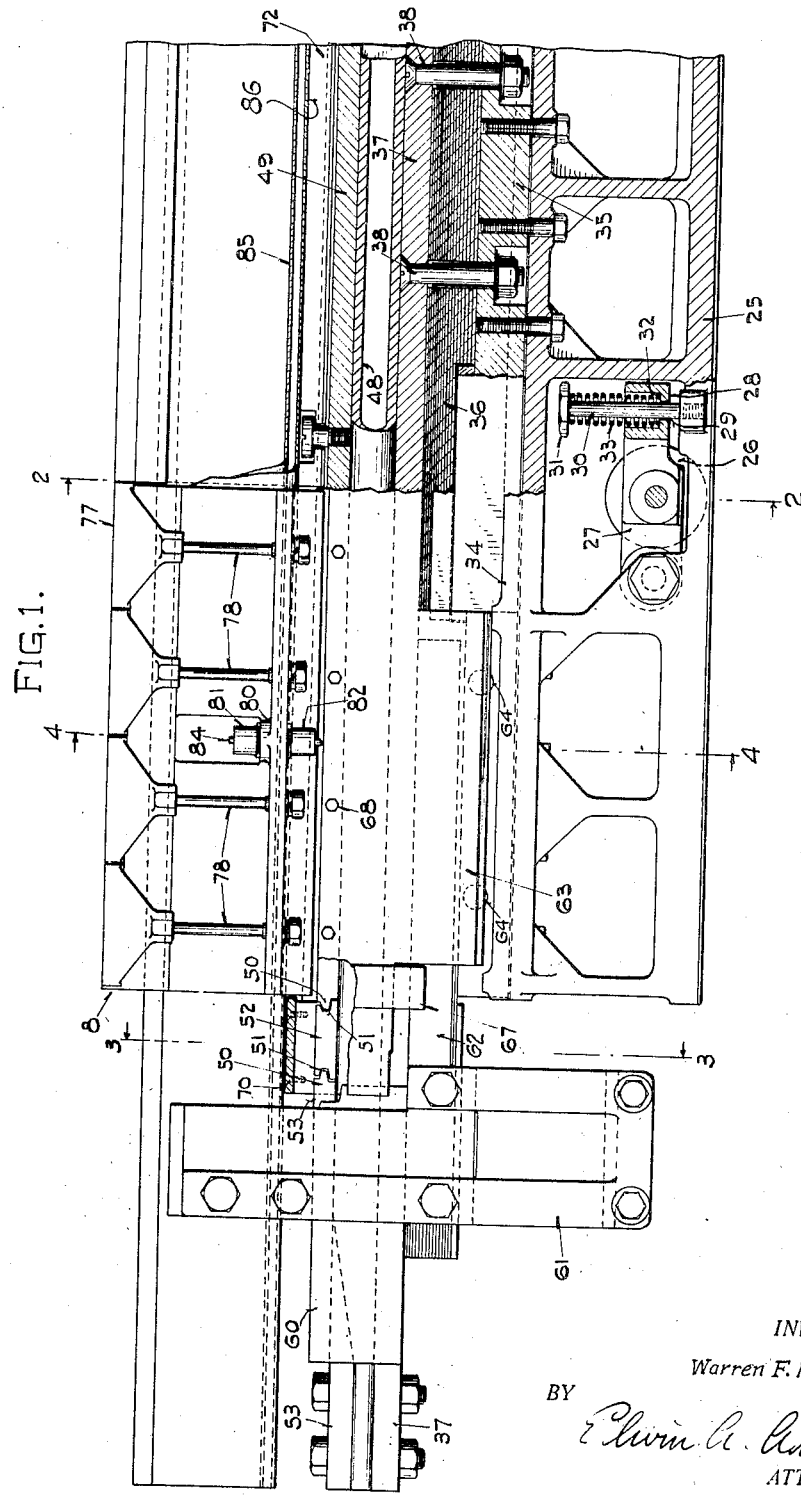

Referring now to the drawings, the numeral 1 represents a tubular blank having its longitudinal edges 2 and 3 arranged in spaced relation preparatory to the welding operation. As illustrated diagrammatically, the current is supplied to the blank through electrodes 4 and 5 disposed on each side of the welding cleft and the edges are caused to move relative to each other by a plurality of oppositely disposed clamping jaws 6 and 7 which are adapted to close about the blank and force the edges together after the same have been brought to a welding condition.

Extending longitudinally within the blank for the full length of the same is an arbor 8 adapted to force the wall of the blank into pressure contact with the electrodes 4 and 5. The arbor is connected to the feed end of the machine by a bracket 9 having a flat upper plate 10 adapted to be secured to the machine in any desired manner. The plate is provided with a channel 11 having a threaded exit 12 for connecting the same to a suitable source of fluid under pressure.

Extending downwardly from the plate 10 is a vertical web portion 13 which is adapted to pass between the edges of the blank when the same is being inserted into the welding machine. The web portion 13 is provided with a plurality of vertical ducts 14 leading from the transverse channel 11 to a longitudinally extending channel 15 below the web portion.

The lower bracket 18 is secured to the bracket 9 by means of bolts 19 and spaced therefrom by a block 20 through which the channel 16 extends. The block 20 may be readily replaced by a block of different length or entirely omitted, depending upon the size of tube being welded.

The bracket 18 is provided with a horizontal passage leading from the vertical channel 16 to a flexible tube 21 secured to the bracket 18 and extending outwardly therefrom.

The bracket 18 is provided with rearwardly extending ears 22 between which a link 23 is pivotally secured by means of a pin 24.

The arbor 8 is provided with a plurality of shoe members 25 arranged in longitudinal alignment and adapted to be supported on the bottom wall of the tubular blank opposite the welding cleft. Each shoe is provided with a pair of aligned rollers 26 disposed on opposite sides of the same which are adapted to support the arbor when the blank is being inserted into the machine.

The rollers 26 are rotatably mounted intermediate the ends of arms 27 which have one of the ends thereof pivotally connected to the shoes 25 and the free ends are provided with laterally extending lugs 28. Extending through the lugs 28 are guide openings 29 through which project the bolts 30 extending upwardly from the shoe members. Confined between the heads 31 of the bolts 30 and suitable recesses 32 in the arms are springs 33 normally tending to force the rollers downwardly into engagement with the bottom of the blank being welded. The springs have sufficient compression to support the weight of the arbor so that during the insertion of the blank the arbor is supported on the rollers and thereby the shoes are prevented from sliding on the bottom of the blank.

When the arbor is expanded in a manner later to be described, the rollers are pressed upwardly against the action of the springs so that the shoes engage the bottom wall of the blank.

The shoes 25 are provided with upwardly extending marginal flanges 34 between which blocks 35 are secured. Seated upon the blocks 35 are a plurality of soft iron laminations 36 which extend the full length of the blank and a substantial distance beyond the ends of the same as is clearly shown in the drawings.

Supported upon the laminations is a longitudinally extending plate 37 which is secured to the blocks 35 by bolts 38 extending downwardly through the laminations and into the blocks 35. The plate 37 extends a substantial distance beyond the ends of the laminations.

The plate at the feed end of the machine (Fig. 1ᵃ) is secured to a longitudinally extending bar 39 which has a bracket 40 fastened to the outer end thereof. The bracket 40 is provided with spaced ears 41 between which the link 23 is pivotally secured by means of a pin 42. The link 23 is provided with extensions 43 and 44 at opposite ends thereof, respectively. The extension 43 has an abutment 45 which engages a shoulder 47 in the bracket 40. The extension 44 has an abutment 46 which engages the lower portion of bracket 18. These extensions 43 and 44, when cooperating with the brackets 40 and 18 limit the downward pivotal movement of the arbor.

Supported upon the plate 37 and extending for the full length thereof is a hose 48 having side walls of sufficient strength to withstand considerable pressure.

Resting upon the hose 48 is a plate 49 which is adapted to be raised and lowered by adjusting the volume of fluid within the hose.

Each end of the plate 49 is provided with a tongue 50 adapted to seat within a groove 51 of a hinge block 52. Pivotally connected to the outer ends of the blocks 52 by a similar tongue and groove connection are bars 53 extending from opposite ends of the machine.

The hose 48 at the feed end of the machine is connected to a pipe 54 through the medium of an elliptical clamp 55 secured to the bar 39.

The bottom face of the bar 53 and the opposed top face of the plate 37 at the feed end of the machine are troughed so that the contour of the faces graduate from a flat face at the inner end to semi-elliptical curvature at the outer end adjacent the clamps, thus causing a gradual change in the cross sectional shape of the hose from the elliptical at the clamps to the flattened within the machine.

The elliptical contour of the clamps 55 and the pivotal action of the block 52, together with the troughed faces of the plate 37 and the bar 53 insure a maximum backing and minimum flexing for that portion of the hose extending beyond the ends of the machine and not subjected to external clamping pressures of the arbor. Such construction enables greater pressures to be employed and considerably lengthens the normal life of the hose.

It should be borne in mind that a hose of elliptical or flattened contour for its full length, and confined or suitably backed parallel to the major axis, but with portions parallel to the minor axis unconfined, as is desirable in the type of article herein disclosed, will withstand greater internal pressure and have a longer life than will the same hose having the end adjacent the clamps in round form. This may be explained by the fact that, in dealing with internal pressures on tubular articles, the stress per unit area in the walls of the tube is directly proportional to the diameter. As usually expressed, $$s = \frac{pd}{2t}$$

where $s$=stress on the fabric per square inch, $p$=head of pressure, $d$=diameter, and $t$=thickness of the walls of the hose in inches. Consequently, in case of the oval or elliptical form of hose, the stress in the unbacked portions of the hose is proportional to the minor diameter or axis, whereas in the case of a hose with round ends adjacent the clamp, the stress in the fabric of the hose at the ends is proportional to the normal diameter.

The device, in this phase of the invention, embodies a construction whereby the unconfined portions of the wall of the hose is subjected to a uniform minimum stress throughout the full length thereof, including those portions extending beyond the end of the machine as well as that within the same.

Expressed in other words, the maintaining of the hose in elliptical or flattened form throughout its full length during the working operation and the provision of backing for the hose parallel to the major axis for the full length thereof results in a distribution of stresses in the walls of the hose such that the major portion of such stresses are exerted against those portions of the hose which are confined and minimum stresses are exerted against the unconfined portions.

The importance of this feature of the invention can not be over stressed as the comparatively short life of the hose was one of the serious practical difficulties which was necessary to be overcome in order to make it possible to employ an arbor of this type. In earlier attempts, wherein round clamps were employed and the contour of the hose was changed from flat inside the machine to round at the clamps, the normal life of the hose was approximately fifty pieces of welded tubes whereas the present construction enables the hose to be used indefinitely.

Although the use of elliptical clamps has been disclosed as the preferred means of connecting the hose to the fluid supply conduit, to accomplish the purposes above set forth, it is understood that various other means may be used without departing from the applicant's invention.

Fitted interiorly of the hose within the clamp 55 is a sleeve 56 having an enlarged end which is provided with a threaded axial opening 57 into which the threaded end of the pipe 54 is secured.

The pipe 54 is rigidly secured to the bar 39 by clamping blocks 58 which serve to rigidly secure the pipe in proper alignment with the hose. The opposite end of the pipe 54 is connected to the flexible tube 21 by means of a suitable union 59 so that fluid pressure from a suitable external source may be supplied to the hose through the medium of the passages in the brackets 9 and 18, spacing block 20, the flexible tube 21 and the pipe 54.

The opposite end of the hose is clamped in flattened condition between the upper face of the plate 37 and the lower inclined face of the bar 53. The plate 37 and the bar 53 are preferably connected together at each end of the machine by side plates 60 disposed on opposite sides of the plates so that the hose is substantially surrounded.

Each end of the arbor is further provided with aligned arbor locating guide brackets 61 secured to the side plates 60 and are adapted to engage the arbor locating jaws of the welding machine in a manner disclosed in the copending application to Eric H. Nilson et al., above referred to.

The arbor locating brackets are also supported by longitudinally extending bars 62 secured to the bottom face of the plate 37.

Secured to the longitudinal side margins of the plate 49 are plates 63 which are disposed on opposite sides of the hose and serve to protect the side walls thereof from the metal flashed from the edges during the welding operation.

In order to maintain the plate 49 in a flat horizontal position at all times, oppositely disposed pairs of spring pressed fingers 64, which are resiliently mounted by means of springs 65 within transverse recesses 66 in the blocks 35, are provided. The fingers are adapted to bear against the lower ends of the plates 63 and thereby prevent shifting of the upper and lower portions of the arbor relative to each other.

Each end of the arbor is provided with oppositely disposed L-shaped brackets 67 which are secured to plate 37 and extend outwardly beyond the side plates 63 and upwardly into engagement with adjustable nuts 68 on said side plates so as to serve as vertical guides for the plate 49 during the movement thereof.

The ends of the side plates 63 project upwardly on opposite sides of the hinge blocks 52 and are connected together by shield plates 70 which extend over the hinge blocks and prevent the metal flashed from the edges from coming into contact with bearing faces of the hinge blocks.

Projecting from the upper face of the plate 49 are a pair of longitudinally extending parallel ribs 71 on which longitudinally aligned pairs of oppositely bowed arms 72 and 73 are pivoted. The upper ends of the arms are bowed inwardly and have downwardly projecting lips 74 and 75.

Seated upon and insulated from the upper ends of each of arms 72 and 73 are a plurality of wear plates or liners 76 and 77 adapted to contact with the wall of the blank directly beneath the electrodes and thereby sustain the walls against the pressure exerted by the electrodes. The liners 76 and 77 are in the form of hook members which seat over the upper and inner faces of the arms and have downwardly extending rods 78 for connecting the same to the lugs 79 on the arms 72 and 73. By such construction, the liners are secured to the arms at points remote from the heat of the arc and the more fragile insulation surrounding the connecting bolts may be more effectively preserved.

Each of the arms 72 and 73 is provided with outwardly extending lugs 80 having a threaded opening for receiving the threaded ends of oppositely disposed cups 81 and 82.

Resiliently mounted, by means of coil springs 83 confined within the chamber formed by the cups 81 and 82, are rods 84 which extend through the bottom of the cup 82 and form spring pressed stops for the outward pivotal movement of the arms. If desired, similar means may be provided for limiting the inward movement of the arms.

Extending longitudinally, within the recess formed by the oppositely bowed arms 72 and 73, is a trough or pan 85 which is adapted to receive metal flashed downwardly from the edges during the arcing or flashing operation. The trough preferably comprises an outer shell 86 and an inner shell 87 spaced from each other at the bottom thereof to form an unobstructed chamber for receiving a cooling medium. The shells may be formed of sheet metal with the upper edge of the outer shell welded to the outer wall of the inner shell. This provides a simple, cheap and durable construction. The passage for the cooling medium in the walls of the trough may be formed in any desired manner.

It has previously been proposed to provide a trough having connections for flowing a cooling medium directly through the same so that the metal flash is quenched and removed during the welding operation. It has been found, however, that in welding comparatively thick stock, the heat of the flash from the prolonged arcing will generate steam within the trough which will cause the metal of the edges to oxidize. By supplementing the cooling action of the flow of cooling medium in the trough by flowing water, through passages in the walls of the trough, the temperature of the cooling medium in the trough may be maintained below the boiling point for a longer period. For extremely thick stock, it may be desirable to dispense with the water in the trough and to pass the cooling medium through the walls only. The trough is preferably made of a metal such as bronze or copper to which the flash does not readily fuse and adhere. This is particularly desirable when no cooling medium is passed through the trough.

The water cooled passage in the walls of the trough at the feed end of the machine is connected by means of a pipe 88 to a suitable duct 89 in the spacer 20, the bracket 9 and the plate 10 which leads to a fluid supply under relatively low pressure as compared to the pressure supplied to the hose 48. Extending from the duct 89 to the trough 85 is a pipe connection 90 having a valve 91 for controlling the supply of cooling fluid into the trough.

Having thus described the invention in detail, it is understood that various modifications may be made within the scope of the accompanying claims.

I claim:

1. In an apparatus for flash welding a longitudinal seam in a tubular blank, an arbor disposed within the tubular blank, said arbor comprising a base, angularly extending pivotal arms carried by the base, a hose disposed between the pivotal arms and said base for forcing the arms outwardly, wear plates secured to said arms in position to engage the inner wall of the blank when the hose is expanded, and means remote from the welding arc for securing said wear plates to said arms.

2. In an apparatus for flash welding a longitudinal seam in a tubular blank, an arbor adapted to be disposed within the blank to be welded, said arbor comprising a base, an expansible hose supported on said base, a pipe connected to a fluid pressure supply, elliptically shaped clamps connecting said hose with said pipe, and clamping arms operated by said hose to support the edges of the blank beneath the welding electrodes.

3. In a machine for flash welding a longitudinal seam in a tubular blank having a welding cleft, an arbor disposed within the blank, a trough having a double wall associated with said arbor and extending longitudinally of the blank beneath the welding cleft, and means for passing a cooling medium between the walls of said trough.

4. In a machine for flash welding a longitudinal seam in a tubular blank, a trough adapted to extend longitudinally of the blank beneath the welding cleft, said trough comprising an outer shell and an inner shell arranged in spaced relation, and means for passing a cooling medium between said shells.

5. In an apparatus for welding, means for clamping the edges of the blank to be welded, said means including an expansible hose, and oval clamps connecting said hose to a pipe leading to a suitable source of fluid under pressure.

6. In an apparatus for flash welding a longitudinal seam in a tubular blank, an arbor disposed within the blank, said arbor comprising a base extending longitudinally through the blank and beyond the ends thereof, a hose supported by said base and extending longitudinally for the full length thereof, means for clamping one end of said hose closed against fluid pressure, a pipe connecting the other end of said hose to a suitable source of fluid under pressure, an elliptical connection between said hose and said pipe, a longitudinally extending plate supported on said hose and adapted to be raised and lowered by the application of fluid pressure to said hose, longitudinally extending bars hinged to the ends of said plate and adapted to form a backing for the hose outside the blank, means for maintaining the outer ends of said bars in fixed position, and arms pivotally connected to said plate and disposed to engage the inner wall of the blank beneath the welding electrodes when pressure is applied to the hose.

7. In an expansible arbor for supporting the walls of a tubular blank against external working pressure, an expansible hose extending longitudinally of said arbor, a pipe connecting said hose with a source of fluid pressure, and elliptically shaped clamping members connecting said hose to said pipe.

8. In a fluid pressure operated expansible member, an expansible hose for operating said member, a pipe connecting said hose to a source of fluid pressure, and elliptically shaped clamps connecting said hose to said pipe.

9. In an apparatus for flash welding a longitudinal seam in a tubular blank, an arbor adapted to be disposed within the blank, said arbor comprising a base adapted to extend longitudinally through the blank and beyond the ends thereof and engage the inner wall thereof opposite the welding cleft, a hose supported by said base and extending longitudinally for the full length thereof, means for clamping one end of said hose, a pipe connecting the other end of said hose to a suitable source of fluid under pressure, an elliptical connection between said hose and said pipe, a longitudinally extending plate supported on said hose and adapted to be raised and lowered by the application of fluid pressure to said hose, longitudinally extending bars hinged to the ends of said plate and adapted to form a backing for the hose outside the blank, means for maintaining the outer ends of said bars in fixed position, angularly extending arms having the converged ends thereof pivotally supported by said plate, and means on the converged ends thereof for engaging the inner wall of the blank on opposite sides of the welding cleft.

10. In an apparatus for flash welding a longitudinal seam in a tubular blank, an arbor adapted to be disposed within the blank, said arbor comprising a base adapted to extend longitudinally through the blank and beyond the ends thereof and engage the inner wall thereof opposite the welding cleft, a hose supported by said base and extending longitudinally for the full length thereof, means for clamping one end of said hose, a pipe connecting the other end of said hose to a suitable source of fluid under pressure, an elliptical connection between said hose and said pipe, a longitudinally extending plate supported on said hose and adapted to be raised and lowered by the application of fluid pressure to said hose, longitudinally extending bars hinged to the ends of said plate and adapted to form a backing for the hose outside the blank, means for maintaining the outer ends of said bars in fixed position, angularly extending arms having the converged ends thereof pivotally supported by said plate, and bearing plates insulated from the converged ends thereof for engaging the wall of the blank on opposite sides of the welding cleft.

11. In an apparatus for flash welding a longitudinal seam in a tubular blank, an arbor adapted to be disposed within the blank, said arbor comprising a base adapted to extend longitudinally through the blank and beyond the ends thereof and engage the inner wall thereof opposite the welding cleft, a hose supported by said base and extending longitudinally for the full length thereof, means for clamping one end of said hose, a pipe connecting the other end of said hose to a suitable source of fluid under pressure, an elliptical connection between said hose and said pipe, a longitudinally extending plate supported on said hose and adapted to be raised and lowered by the application of fluid pressure to said hose, longitudinally extending bars hinged to the ends of said plate and adapted to form a backing for the hose outside the blank, means for maintaining the outer ends of said bars in fixed position, angularly extending arms having the converged ends thereof pivotally supported by said plate, bearing plates insulated from the converged ends thereof for engaging the wall of the blank on opposite sides of the welding cleft, a trough disposed between said arms and below the welding cleft, and means for passing a cooling medium through the walls of said trough.

12. An expansible mandrel for working a tubular article comprising, means for engaging the inner surface of the tubular article at a plurality of positions, a fluid actuated flexible hose having a working portion disposed in flattened shape between said engaging means for exerting force upon them, one end portion of said hose extending to constitute a connecting portion, a pipe connected to the end of the connecting portion of the hose, and means for confining the connecting portion of the hose to avoid excessive stress in the wall of the hose when it is subjected to fluid pressure.

13. In a mandrel provided with blank engaging members disposed for relative movement, in combination, a flexible hose disposed between the blank engaging members to actuate them, means for supplying fluid under pressure to the hose, said hose comprising a working portion which is utilized to operate the blank engaging members and a connecting portion which extends between the working portion and the means for supplying fluid under pressure, and means for controlling the shape taken by the connecting portion when subjected to fluid under pressure supplied to inflate the hose and effect the actuation of the blank engaging members.

14. In a mandrel provided with blank engaging members disposed for relative movement and means for conveying fluid under pressure to effect the operation of the blank engaging members, in combination, a flexible hose, said hose comprising a working portion disposed between the blank engaging members and a connecting portion extending between the working portion and the means for supplying fluid under pressure, and reenforcing members engaging areas of the connecting portion of the hose to restrict the shape that it may take when subjected to fluid under pressure, thereby to limit the total pressure that may be imposed upon the areas of the connecting portion of the hose that are not reenforced.

15. An expansible arbor comprising, a plurality of relatively movable parts, a flexible tubular member closed at one end having a working portion disposed in flattened condition between the movable parts with its edge portions unconfined and its open end extending therefrom constituting a connecting portion, a pipe connected to the open end of the tubular member for supplying fluid under pressure, and means for engaging the connecting portion of the tubular member to hold it to substantially elliptical shape, whereby the stresses in the connecting portion of the tubular member are prevented from greatly exceeding the stresses in the unconfined edges of the flattened working portion when fluid pressure is applied to expand the arbor.

16. In a mandrel provided with blank engaging members disposed for relative movement and means for conveying fluid under pressure to effect the operation of the blank engaging members, in combination, a flexible hose, said hose comprising a working portion disposed between the blank engaging members and a connecting portion extending between the working portion and the means for supplying fluid under pressure, stationary and movable reenforcing members for controlling the shape taken by the connecting portion of the hose, the movable reenforcing member being disposed adjacent the juncture of the connecting and working portions of the hose, thereby to permit the end of the working portion of the hose to freely change its shape to effect the operation of the blank engaging members and to gradually merge the connecting portion into the shape of the working portion while preventing its reenforced walls from spreading a distance greater than the separation of the walls of the working portion in the direction of movement of the blank engaging members.

17. In apparatus for flash welding a longitudinal seam in a tubular blank having a welding cleft, the combination with electrodes disposed to engage the outer surface of the blank at each side of the welding cleft, of an arbor disposed within the blank comprising a base in engagement with the inner surface of the blank, arms carried by the base disposed beneath the inner surface of the blank at each side of the welding cleft, wear plates hooked over the ends of the arms and insulated therefrom, means distant from the welding cleft including insulating means for securing the wear plates to the arms, and means for expanding the arbor to press the wear plates against the blank for supporting the edges of the welding cleft to resist the pressure exerted by the electrodes.

In witness whereof I have hereunto subscribed my name at Milwaukee, Wisconsin, this 10th day of January, 1931.

WARREN F. HEINEMAN.